June 28, 1949.   E. A. BINNEY   2,474,648
DYNAMOELECTRIC MACHINE

Filed Feb. 24, 1945    2 Sheets-Sheet 1

WITNESSES:
E. A. McCloskey
F. P. Lyle

INVENTOR
Eric A. Binney.
BY O. B. Buchanan
ATTORNEY

June 28, 1949.  E. A. BINNEY  2,474,648
DYNAMOELECTRIC MACHINE
Filed Feb. 24, 1945  2 Sheets-Sheet 2

WITNESSES:
E. A. M:Closkey
F. P. Lyle

INVENTOR
Eric A. Binney.
BY O. B. Buchanan
ATTORNEY

Patented June 28, 1949

2,474,648

UNITED STATES PATENT OFFICE 2,474,648

DYNAMOELECTRIC MACHINE

Eric Alton Binney, Ilkley, England, assignor to The English Electric Company Limited, London, England, a British company Application February 24, 1945, Serial No. 579,584
In Great Britain February 24, 1944

13 Claims. (Cl. 322—63)

This invention concerns direct-current dynamoelectric machines of the amplifying type and is related to the invention of my copending application Serial No. 5,098, filed January 29, 1948.

One type of dynamo-electric amplifier is excited by armature reaction, there being a pair of cross connected brushes between the normal commutator brushes of the machine and such a machine has the advantage of rapid response to the controlling current or voltage. An object of the present invention is to enable a quick response to be obtained with a normal type of machine as an alternative to the armature reaction type of machine, although the invention can be combined with a machine of the latter type.

According to the invention, a direct-current dynamo-electric machine has an armature, a self-excited field winding and a separately excited or controlling field winding to which can be applied an excitation dependent on the magnitude which is to be amplified, these two field windings having no appreciable mutual inductance, i. e. there is substantially no magnetic coupling or no appreciable magnetic coupling between the two field windings.

Figure 1:
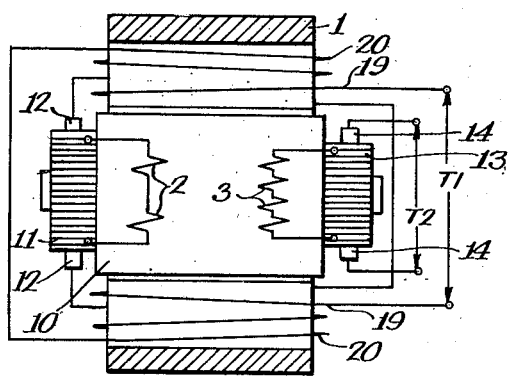
Figure 2:
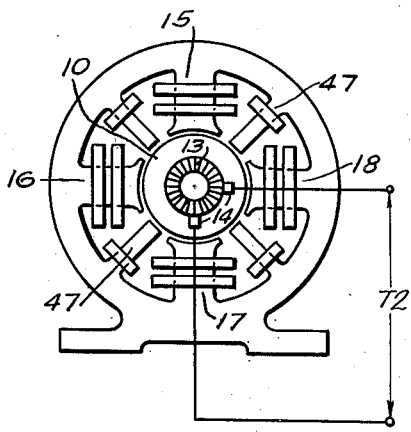
Figure 3:
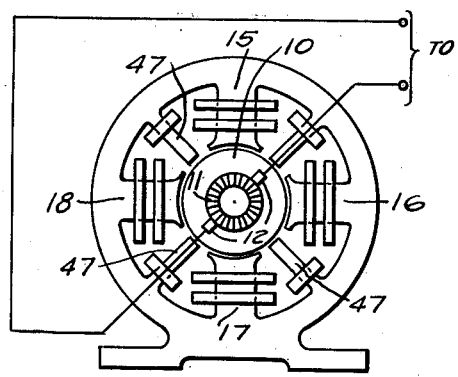
Figure 4:
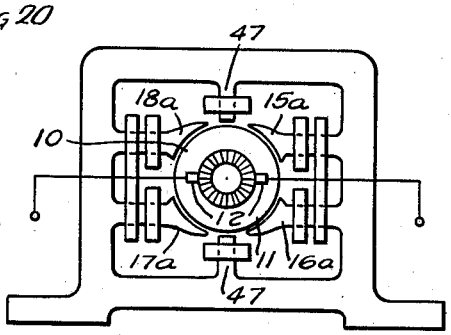

The invention is illustrated by the accompanying drawings, in which:

Fig. 1 is a schematic and part-sectional axial view of one form of the invention, Figs. 2 and 3 are two more realistic views from opposite ends of the same machine, Fig. 4 is a view of a modified embodiment, and Figs. 5 to 15 show various ways of connecting the windings of a machine according to Figs. 1 to 3, or Fig. 4.

According to Fig. 1, the machine represented by Figs. 1 to 3, has a field structure 1 and an armature 10. The armature has two systems of armature windings, shown schematically and denoted by 2 and 3. Armature windings 2 are wound for a two-pole ($n$-pole) system, while armature windings 3 are wound for a four-pole ($m$-pole) system. The armature has a commutator 11 for winding 2 with appertaining collector brushes 12 (Fig. 3). A second commutator 13 is connected with the winding 3 and has brushes 14 (Fig. 2). The field structure 1 has four pole pieces 15, 16, 17 and 18 which carry a two pole ($n$-pole) field winding 19 and a four-pole ($m$-pole) field winding 20. The field winding 19 is a separate-excitation winding and connected to terminal T. The field winding 20 is self-excited and connected to brushes 12. The brushes 14 are connected to terminals T2. The two armature windings can occupy the same armature slots, one being placed over the other. The commutators may conveniently be placed at opposite ends of the armature as shown.

If, at the speed which the machine is rotated, the field winding 20 is just insufficient—when unaided—to cause the machine to generate, then the application to terminals T1 of field winding 19 of an electro-motive force (E. M. F.) dependent on the magnitude which is to be amplified will increase the total excitation sufficiently to enable the armature 10 to energize the winding 20 and so produce an E. M. F. in the armature 10 (and a voltage across the output terminals T2 connected to the brushes 14) which is substantially proportional to and a considerable amplification of the E. M. F. applied to winding 19. This proportionality exists so long as the flux paths are unsaturated, because under that condition the build-up of current in field winding 20 will have substantially no reaction on the field winding 19. Consequently the voltage across terminals T2 will respond promptly to changes in the voltage applied to terminals T1. More in detail, the winding 19 wound around pole pieces 15 and 16 to make them both, for example, north poles and around poles 17 and 18 to make them both, for example, south poles, will produce a 2-pole magnetic field which will have no appreciable effect on the armature winding connected to commutator 13 while the four pole winding 20 around pole pieces 15 to 18 making them north, south, north, south poles respectively will have no appreciable effect on the armature winding connected to commutator 11.

Fig. 4, which is a modification of Fig. 3, shows the field system having one pole structure divided into parts 15a and 16a and another pole structure divided into parts 17a and 18a. The 4-pole field winding is wound around each of these parts separately. The 2-pole field winding has coils embracing parts 15a and 16a as a whole, to form one pole, and coils embracing parts 17a and 18a to form the other pole. Figs. 2, 3 and 4 also show interpoles 47 with coils thereon, which may be connected in conventional manner in series with the respective armature windings for the purpose of satisfactory commutation.

Figure 5:
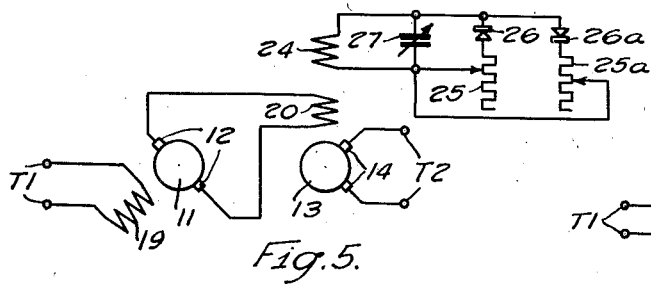

In Fig. 5 the 2-pole field winding is represented at 19 and connected to terminals T1; the 4-pole field winding is represented at 20 and connected across the brushes 12. If now a voltage proportional to the magnitude to be amplified be applied to terminals T1 of the 2-pole field winding 19, which thus acts as the control winding, the 2-pole field produced will not induce an E. M. F. in the armature winding connected to commutator 13, nor will the application of this E. M. F. to the 2-pole field winding 19 have any appreciable inductive effect on the 4-pole field winding 20. The E. M. F. induced in the armature winding connected to commutator 11 will energize the 4-pole field winding 20 through commutator 11 and brushes 12; the 4-pole field will induce an E. M. F. in the armature winding connected to commutator 13 without having any action on either the 2-pole armature winding or the 2-pole field winding. The 4-pole armature winding will consequently yield, across the brushes 14 and terminals T2 connected thereto a highly amplified E. M. F. substantially proportional to that applied to the 2-pole field winding and the device will be comparatively quick in response. Again, the proportionality exists so long as the flux paths are unsaturated.

The rate of response can be adjustably reduced by the damping field winding 24 shown in Fig. 5, which is magnetically coupled with the 4-pole field winding 20 and has its circuit closed through the adjustable resistance 25 or additionally or alternatively through the adjustable condenser 27. If this damping action is desired only in one sense, the rectifying valve 26 is included in the circuit of resistance 25, or if a separately adjustable damping action be required in the reverse sense a further adjustable resistance 25a and a rectifier 26a connected in the opposite sense to rectifier 26 are connected in shunt to resistance 25 and rectifier 26.

Figure 6:
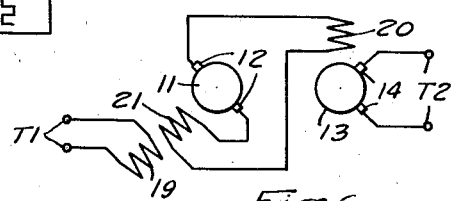

The amplification can be increased in various ways. Fig. 6, for example, shows a two-pole compounding field winding 21 in series with the circuit of brushes 12 and field winding 20.

Figure 7:
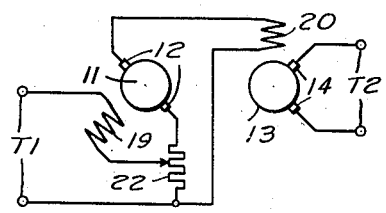

Fig. 7 shows another way of achieving the same result as Fig. 6. The circuit of winding 19 includes an adjustable part of the resistance 22 which is in the circuit of brushes 12 and field winding 20; thus there is injected into the circuit of winding 19 an E. M. F. proportional to the voltage across brushes 12.

Figures 8, 9:
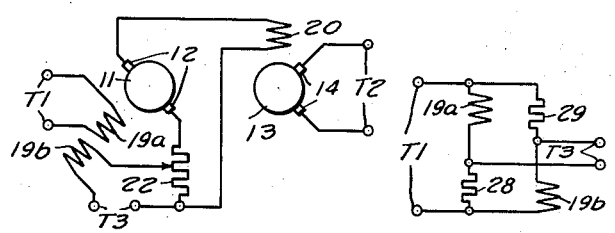

Fig. 8 shows the control winding as two separate windings 19a and 19b which can be supplied from two different sources which can be connected to terminals T1 and T3, if the machine be desired to act as a differential or additive exciter. In this case the circuit of winding 19b includes the adjustable part of the resistance 22 which is in the circuit of brushes 12 and field winding 20; thus there is injected into the circuit of winding 19b an E. M. F. proportional to the voltage across brushes 12. Fig. 9 shows another modification of the connections wherein the sections 19a and 19b of the control winding are connected as opposite arms of a bridge of which the other arms are the resistors 28 and 29. One pair of opposite corners of this is connected to the terminals T1 and the other pair to the terminals T3 so that the control field can be energized in accordance with the sum or difference of the voltages of two sources by connecting them to these terminals.

Figure 10:
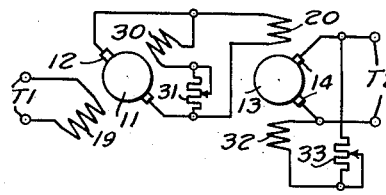

Fig. 10 shows another way of increasing the amplification by the addition of the compounding field winding 30 assisting the 2-pole control winding 19 and connected in series with resistor 31 across the 2-pole armature winding through commutator 11 and brushes 12. Alternatively or additionally the amplification may be increased by the field winding 32 assisting the 4-pole field winding 20 and connected in series with the resistor 33 across the 4-pole armature winding through the commutator 13 and the brushes 14 as also shown in Fig. 10. Like field winding 7 of Fig. 1 the windings 21, 30 and 32 are insufficient, when unaided, to cause the machine to generate.

Figures 11, 12:
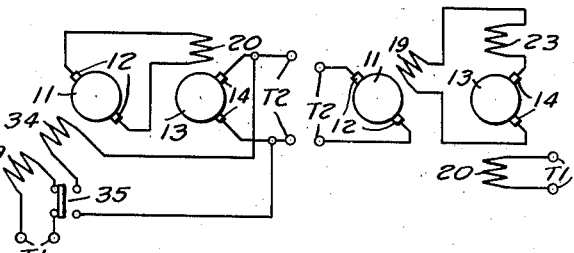

Fig. 11 shows a field winding 34 connected across the 4-pole armature winding through brushes 14 in a sense to oppose the 2-pole field winding 19, and in series with two contacts of switch 35 which has two contacts in series with winding 19. When the machine is to be de-energized, the control field winding 19 is switched off by movement of the switch 35 from the position in which it is shown to the opposite position, thereby connecting up the winding 34 which acts as a so-called "suicide" winding to eliminate residual magnetism in the field system.

In the winding arrangements so far described the 2-pole field winding is the controlling winding and the output is derived from the 4-pole armature winding. Fig. 12 shows the 2-pole field winding 19 connected in series with a 4-pole winding 23 across the brushes 14; the controlling E. M. F. can be applied to the terminals T1 across which the 4-pole field winding 20 is connected, and an amplified output proportional to the controlling E. M. F. can be derived from the 2-pole armature winding across the brushes 12 through terminals T2.

Figure 13:
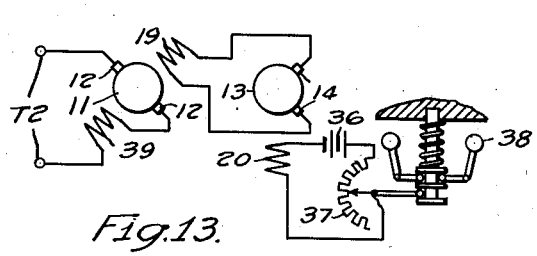

Fig. 13 shows a modification of Fig. 12 in which the machine can be used as a motor if the power supply is to the terminals T2 and so to brushes 12 through the 2-pole series field 39; the controlling field winding 20 is supplied from the source 36 through the rheostat 37 and serves to control the speed while requiring only a small amount of power from source 36. If the speed of the machine is to be automatically maintained at approximately a constant value, the rheostat 37 may be actuated by the speed governor 38 as indicated in Fig. 13. The arrangement according to Fig. 5 could also be used as a motor by supplying power to terminals T2.

Figure 14:
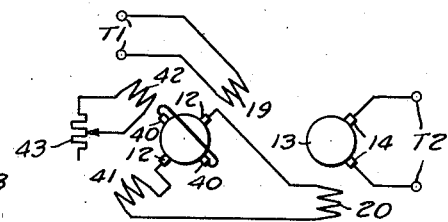

In Fig. 14 the commutator 11 is provided not only with the brushes 12, but also with a pair of brushes 40 displaced at 90 electrical degrees from the brushes 12 and electrically connected together. In addition to the 2-pole controlling field winding 19 connected to terminals T1, there is the 2-pole compensating field winding 41 on the axis of and connected across the brushes 12 in series with the 4-pole field winding 20. The compensating field winding is wound to reduce the effect of armature reaction in the control field of winding 19. In this arrangement, there will be an initial stage of amplification, making, in all, three stages of amplification in the machine. The rate of response may be adjusted by the 2-pole field winding 42 on the axis of brushes 40 and having its circuit closed through the adjustable rheostat 43.

Figure 15:
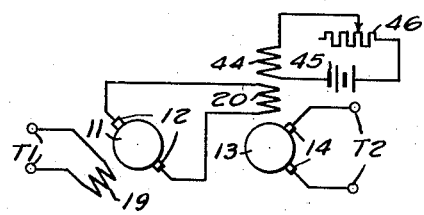

If with the arrangement shown in Fig. 8 or Fig. 9 a steady biassing voltage be applied across the terminals T3 a steady mean output voltage can be derived from the machine while the E. M. F. applied to terminals T1 is zero. If an E. M. F. be applied to terminals T1 in one sense or another the output voltage will rise above or fall below the mean value by an amount which is an amplification of the applied voltage. An alternative method of achieving this result is shown in Fig. 15 wherein a steady adjustable voltage is applied from the source 45 through the adjustable resistance 46 to the 4-pole field winding 44 which accordingly produces a steady mean voltage across brushes 14 and terminals T2 when no E. M. F.

is applied to terminals T1 and 2-pole field winding 19 and hence no voltage is produced across brushes 12 and in 4-pole field winding 20.

What I claim as my invention and desire to secure by Letters Patent is:

1. A rotary direct current machine, comprising a normally unsaturated magnetic circuit including a multipolar field structure and an armature, said armature having a plurality of winding groups and a corresponding plurality of groups of commutator brushes connected with said respective winding groups, separately excitable field windings disposed on said field structure so as to cause—when the machine is operated as a generator—a voltage to be generated between a first group of said brushes, self-excitation field windings under control by said voltage and disposed on said field structure so as to cause—during generator operation—another voltage to be generated between another group of said brushes, and an external circuit connected to said other group of brushes.

2. A rotary direct current machine, comprising a normally unsaturated magnetic circuit including a multipolar field structure and an armature, said armature having two sets of windings and two respective commutators therefor, each of said commutators having a set of brushes, self-excitation field windings disposed on said field structure and controlled by current flowing between the brushes of one of said set of brushes, a separate-excitation field winding disposed on said field structure for controlling said current, and circuit leads attached to said other set of brushes to carry current controlled by said self-excitation field winding.

3. A rotary direct current machine, comprising a normally unsaturated magnetic circuit including a multipolar field structure and an armature, said field structure having a separate-excitation field winding of a first number of poles and a self-excitation field winding of a second and larger number of poles, said armatures having two sets of windings and two appertaining commutators correlated to said two field windings respectively, and said self-excitation field windings being connected to said commutator correlated to said separate-excitation field winding.

4. A direct-current dynamo-electric machine, comprising a normally unsaturated magnetic circuit having a multipolar field structure and an armature, commutating means having a plurality of sets of brushes to establish a corresponding plurality of separate circuits through said armature, a separate-excitation field winding disposed on said structure to generate a first voltage across the brushes of one of said sets, a self-excitation field winding disposed on said structure and controlled by current due to said first voltage for generating a second voltage between the brushes of said other set, said self-excitation field winding being rated to be just-insufficient for generating said second voltage when said armature is running at normal speed while said separate-excitation winding is unexcited.

5. A direct-current dynamo-electric machine, comprising a normally unsaturated magnetic circuit having a multipolar field structure and an armature, said armature having two sets of windings and two respective commutators therefor, each of said commutators having a set of brushes, self-excitation field windings disposed on said field structure and controlled by current flowing between the brushes of one of said set of brushes, a separate-excitation field winding disposed on said field structure for controlling said current, said two field windings being substantially non-inductive relative to each other.

6. A direct-current dynamo-electric machine, comprising a normally unsaturated magnetic circuit having a multipolar field structure and an armature, said armature having two commutators each having a set of brushes to establish two separate circuits through said armature, a separate-excitation field winding disposed on said structure to generate a first voltage across the brushes of one of said sets, a self-excitation field winding disposed on said field structure and controlled by current due to said first voltage for generating a second voltage between the brushes of said other set, said two field windings being substantially non-inductive relative to each other, and said self-excitation field winding being rated to be just-insufficient for generating said second voltage when said armature is running at normal speed while said separate-excitation winding is unexcited.

7. A direct-current dynamo-electric machine, comprising a magnetic field system, an $m$-pole field winding and an $n$-pole field winding thereon, where $m/n$ is an even number, said two windings having no appreciable mutual inductance, an armature associated with said field system and common to said two field windings, an $m$-pole winding and an $n$-pole winding disposed on said armature, a first commutator connected to said $n$-pole armature winding, a second commutator connected to said $m$-pole armature winding, respective sets of collecting brushes on said commutators, one of said field windings being excited under control by current flowing between brushes of one of said sets, input leads connected to said other field winding, and output leads connected to said other set of brushes.

8. A direct-current dynamo-electric machine, comprising a magnetic field system, an $m$-pole field winding and an $n$-pole field winding thereon, where $m/n$ is an even number, an armature associated with said field system and common to said two field windings, said armature having an $m$-pole winding and an $n$-pole winding and two sets of commutator brushes for said respective armature windings, said $m$-pole field winding being connected by one of said sets of brushes across said $n$-pole armature winding, another $n$-pole field winding being disposed on said field system and being connected in circuit with said $m$-pole field winding, circuit means connected to said first $n$-pole field winding to apply excitation thereto, and circuit means connected to said other set of brushes to derive amplified energy therefrom.

9. With a machine according to claim 8, in combination, a damping field winding disposed on said field system and inductively coupled with one of said other field windings, and a variable impedance device in closed-circuit connection with said damping field winding.

10. A machine according to claim 8, wherein an additional self-exciting field winding is disposed on said field system, connected across one of said armature windings, and wound for the same number of poles as the armature winding across which it is connected.

11. A direct-current dynamo-electric machine, comprising a magnetic field system, an $m$-pole field winding and an $n$-pole field winding thereon, where $m/n$ is an even number, an armature associated with said field system and common to said two field windings an $m$-pole winding and an $n$-pole winding disposed on said armature, a first commutator connected to said $n$-pole armature winding, a second commutator connected to said $m$-pole armature winding, circuit means connected to said $n$-pole field winding to supply input energy thereto, a first pair of brushes associated with the commutator of said $n$-pole armature winding and arranged to provide a voltage drop generated under control by said $n$-pole field winding, a cross-connection between the brushes of said first pair to provide armature-reaction excitation, a second pair of brushes associated with said latter commutator and displaced substantially 90 electric degrees from said first pair of brushes to develop an amplified voltage between the brushes of said second pair under control by said armature-reaction excitation, said $m$-pole field winding being connected to said second pair of brushes to be excited by said amplified voltage, and a set of brushes associated with said other commutator to derive a further amplified voltage therefrom under control by said $m$-pole field winding.

12. A machine according to claim 11, wherein an $n$-pole compensating field winding is disposed on said field system and connected in series with said $m$-pole field winding, said compensating field winding being wound to reduce the weakening effect of armature reaction on said input-energy excited $n$-pole field winding.

13. A direct-current dynamo-electric machine, comprising a normally unsaturated magnetic circuit having a four-pole field structure and an armature, a four-pole field winding and a two-pole field winding disposed on said structure, said armature having correspondingly a four-pole armature winding and a two-pole armature winding and two appertaining commutators, the commutator appertaining to said two-pole armature winding having a first pair of brushes arranged to provide a first voltage under control by said two-pole field winding, a cross-connection between the brushes of said first pair to provide armature-reaction excitation, a second pair of brushes associated with said latter commutator and displaced substantially 90 electric degrees from said first pair of brushes to develop an amplified voltage between the brushes of said second pair under control by said armature-reaction excitation, said four-pole field winding being connected to said second pair of brushes to be excited by said amplified voltage, and a set of brushes associated with said other commutator to derive a further amplified voltage therefrom under control by said four-pole field winding.

ERIC ALTON BINNEY.

REFERENCES CITED

The following references are of record in the file of this patent:

UNITED STATES PATENTS

| Number | Name | Date |
| --- | --- | --- |
| 1,255,400 | Ferris | Feb. 5, 1918 |
| 1,468,157 | Holifield | Sept. 18, 1923 |
| 2,000,699 | Harding | May 7, 1935 |
| 2,018,107 | Allen | Oct. 22, 1935 |
| 2,060,244 | Roe | Nov. 10, 1936 |
| 2,094,492 | Pestarini | Sept. 28, 1937 |
| 2,183,397 | Grundschneider | Dec. 12, 1939 |